Oct. 16, 1962 H. H. ABBOTT 3,059,058
SUBSCRIBER LINE CIRCUIT WITH LOCAL RINGING
Filed Dec. 23, 1960
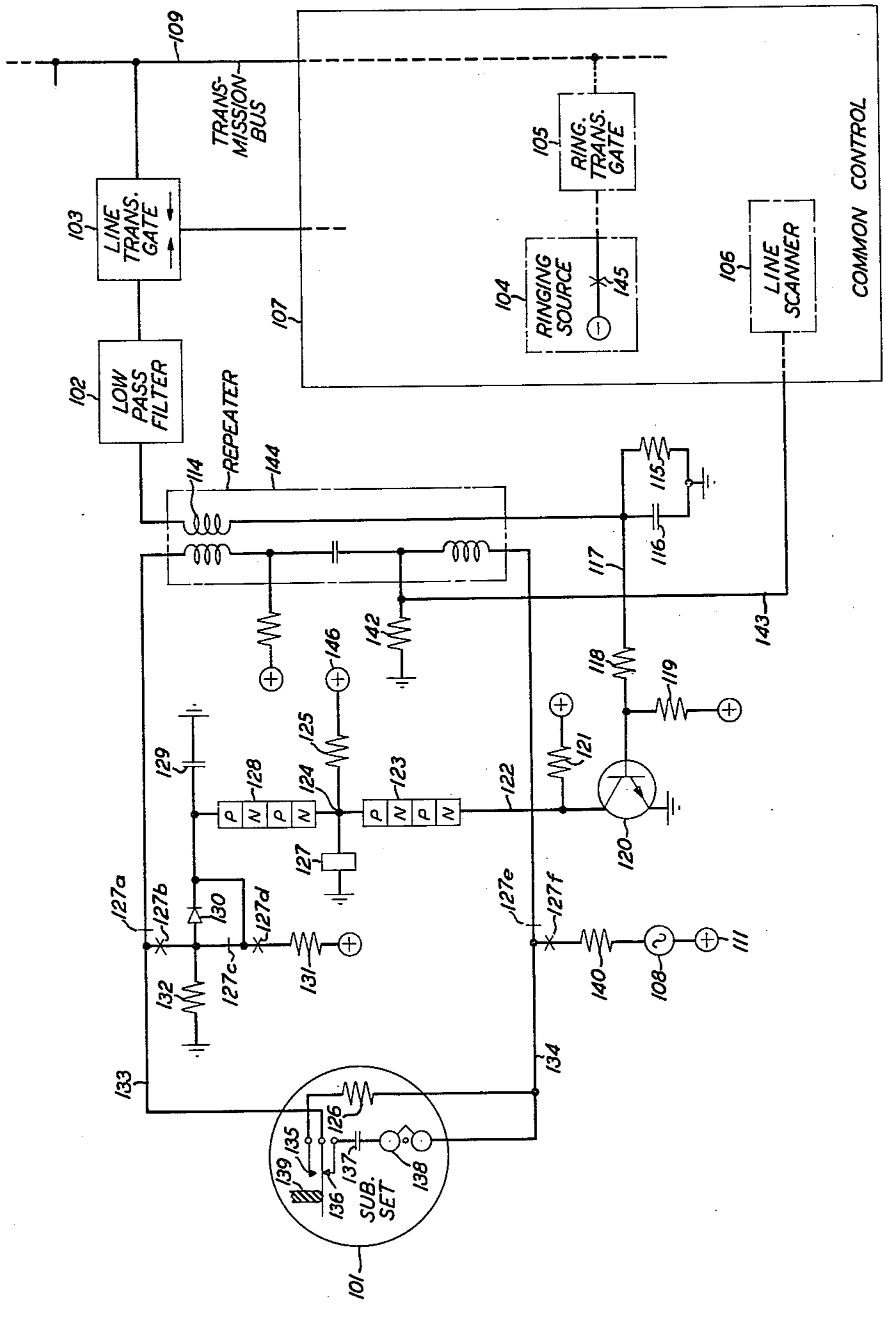
INVENTOR
H. H. ABBOTT
BY
ATTORNEY United States Patent Office 3,059,058
Patented Oct. 16, 1962

3,059,058

SUBSCRIBER LINE CIRCUIT WITH LOCAL RINGING

Henry H. Abbott, Chatham, N.J., assignor to Bell Telephone Laboratories, Incorporated, New York, N.Y., a corporation of New York Filed Dec. 23, 1960, Ser. No. 78,147
15 Claims. (Cl. 179—18)

This invention relates in general to signaling in telephone systems, in particular to substation signaling in such systems, and specifically to substation line ringing arrangements in electronic telephone systems.

The substation ringers enjoying almost universal usage today are those of the capacitive or gas tube types. These ringers have a high power requirement, and typically may operate from a 20-cycle ringing source comprising 90-volts alternating current impressed on 48-volts direct current. The standard arrangement for supplying ringing comprises a ringing machine in central, common control equipment which transmits such ringing over voice transmission paths to the substation line. In telephone central offices, of the space-division type shown in A. J. Busch Patent No. 2,585,904 of February 19, 1952, for example, the ringing machine will generate a six second ringing cycle comprising two seconds of ringing, the ringing interval, alternating with four seconds of silence, the silent interval. The ringing is transmitted over central switches to an outlying substation via the regular talking paths of the system.

With the advent of time-division switching, and in the electronic telephone systems embodying this switching principle, the traditional manner of providing substation ringing has become subject to re-examination. This is due to the fact that transmission paths and gates in such systems cannot transmit sufficient power to operate standard ringers of the types referred to above. A technically satisfactory solution to the problem of ringing in electronic systems is to be found in "tone ringing." As is well known, tone ringing may be accomplished over the low power capacity voice transmission paths of an electronic system. In addition, and also as was the case in previous systems, central ringing equipment retains complete control over the ringing cycle, generating tone signals during a ringing interval and generating no such signals during an alternative silent interval. An example of such a ringing arrangement may be found in D. B. James et al. Patent No. 2,957,949 of October 25, 1960; this patent will be referred to as the James patent in what follows.

A difficulty with tone ringing is that special substation equipment is required to accommodate low power tone signals. Since existing ringers, adapted to 20-cycle alternating current ringing, represent a large proportion of the telephone plant investment, considerable effort has been directed toward devising ringing arrangements which would make such ringers compatible with the electronic switching environment. The need for satisfactory arrangements of this type is especially acute in situations where several parties have access to a single line, as in the case of key telephone systems for example.

Two arrangements providing the desired compatibility appear in H. E. Vaughan Patent 2,971,060, issued February 7, 1961. In the first of these arrangements, ringing control signals, which may correspond to the tone signals of the James patent, are transmitted over the regular voice transmission path as in the case of tone ringing; a relay individually associated with the line to be rung responds to these control signals, and during their persistence will transfer the line to a source of 20-cycle ringing. The second arrangement differs from the first in that the relay which transfers the line in response to the advent of control signals of the first type will lock operated; this relay is released at the end of the ringing interval by a second relay which operates momentarily in response to control signals of a second type.

In both of the local ringing arrangements illustrated by Vaughn, and as is the case in Busch and James mentioned above, the central equipment must exercise complete control over each ringing cycle with respect to the timing thereof. While the initiation of ringing is appropriately a common control function, however, the demand that the central equipment exercise such intimate control over each ringing cycle constitutes an unnecessary burden on that equipment.

Vaughn's second arrangement offers an advantage over his first in that control signals need not be transmitted during the entire ringing interval. The central equipment is thus relieved of the burden of exercising continuous control during that interval. In addition, such an arrangement lessens the amount of "cross-talk" in the system. Cross-talk arises from the imperfection of the switching action at transmission gates in a time-division system, and tends to be exacerbated when the information being transmitted by these gates is ringing signals which are usually of high magnitude compared to ordinary speech-representative signals. Nevertheless, Vaughn's second arrangement, though completely operative and useful, taxes the central control with the burden of beginning and ending each ringing cycle.

A further problem presented by arrangements such as that Vaughan discloses is that of answer detection. Answer detection in time-division systems such as James discloses is performed by central line scanning equipment. This equipment monitors a rung line and detects the flow of current in the talking path thereof which is an incident to the substation going "off-hook" when the called subscriber answers. When the line is opened upon the substation being transferred to a source of local ringing as Vaughan provides, the talking path may no longer be completed when the called subscriber answers, and the scanning equipment is thus rendered ineffective during each ringing interval. This divorce of answer detection apparatus from the substation gives rise to the undesirable possibility that a subscriber answering at the beginning of a ringing interval would continue to receive ringing for the entire duration of that interval. It is thus of considerable advantage to make a "ring trip" provision in such local ringing arrangements, whereby the local ringing may be prematurely terminated should the subscriber answer during a ringing interval.

The general object of this invention is to improve the ringing operation in telephone systems. More specifically, an object of the invention is to improve the substation ringing operation in electronic telephone systems so that standard ringers may be used therein.

Another object of the invention is to provide an improved arrangement for supplying high power ringing to substations in electronic telephone systems.

A further object of the invention is to reduce the amount of cross-talk incident to substation ringing in electronic telephone systems.

Still another object of the invention is to control, at a substation line, the duration of the application of ringing thereto.

Yet another object of the invention is to supply high power ringing to substation lines and to time the application of such ringing at these lines.

A still further object of the invention is to control the duration of the ringing interval at a substation line and to terminate ringing when the called subscriber answers within this interval.

A yet further object of the invention is to improve the timing of the application of ringing to a substation line.

These and other objects of the invention are achieved in a specific illustrative embodiment wherein a self-timed ringing application circuit is provided at each line associated with an electronic telephone system of the time-division type. The circuit applies local ringing to the line in response to a brief ringing control pulse applied only once per ringing cycle, and includes means to trip ringing when the called subscriber answers during a ringing interval.

The basic line circuit is of the repeater-terminated type having a line scanning provision such as is illustrated in the James patent. The substation equipment, however, is such as is now in general use, and comprises a 20-cycle ringer at which the line normally terminates and switch-hook contacts which transfer the line from the ringer to the substation talking path when the called subscriber answers in response to ringing. The illustrative ringing application circuit individual to the basic line circuit comprises the elements of a source of 20-cycle ringing current, a ringing application relay, a timing circuit, a ring trip diode, a triggering P-N-P-N diode, a memory P-N-P-N diode, and a pulse responsive switching transistor.

The switching transistor is associated with the repeated end of the line circuit, and momentarily switches from its "on" to its "off" state in response to a very short ringing control pulse transmitted to the line at the beginning of each ringing cycle from central ringing equipment. The normally conducting memory diode is rendered nonconducting when the transistor switches off, and remains nonconducting and independent of the switching transistor for the duration of the ensuing ringing interval. Only minimal control need therefore be exercised by the central equipment.

The memory diode while in its conducting condition effectively shunts the winding of the ringing application relay and prevents its operation. When the memory diode conducts in consequence of the receipt of a ringing control pulse, the shunt is removed and the relay operates. The operated relay opens the line circuit, applies standard 20-cycle ringing toward the substation end thereof, and energizes the timing circuit. The timing circuit comprises a timing capacitor which charges to measure a ringing interval of approximately two seconds. At the end of the two second interval, the potential across the timing capacitor is sufficient to render conducting the normally nonconducting trigger diode. The trigger diode in conducting raises the potential across the memory diode to a point at which the latter will begin to conduct. Conduction in the memory diode shunts down the ringing application relay which thereupon releases to disconnect the 20-cycle ringing source from the line. The two second ringing interval is thus maintained, timed, and concluded under the exclusive control of the ringing application circuit, and the central equipment thereby is relieved of a large part of its signaling burden.

The source of 20-cycle ringing is connected to one side of the line during the ringing interval, and the current from this source passes through the substation ringer onto the opposite side of the line so that one-half of each cycle of ringing current tends to charge the timing capacitor through the ring trip diode. Due to the high impedance of the ringer, however, this current is insufficient to significantly affect the charging rate of the timing capacitor. But when the called subscriber answers during the ringing interval, the low impedance substation talking path is substituted for the high impedance ringer, and ringing current is transmitted by the ring trip diode to immediately charge the timing capacitor. This causes the ringing application relay to be released, concluding the ringing interval in the manner previously described. The ring trip function is, therefore, accomplished by reducing the charging time of the timing capacitor to something less than the normal two seconds. When the ringing application relay is thus prematurely released, the central line scanning equipment may detect the answer condition and a talking connection will be completed in the usual manner.

A feature of the invention is a line circuit in an electronic telephone system having means individual thereto for applying high power ringing to a ringer associated with the line circuit.

Another feature of the invention is means individual to a line circuit for timing the application of ringing to that circuit.

A further feature of the invention is ringing application means local to a line circuit which is operated by a briefly applied control signal, the control signal having to be applied but once per ringing cycle.

Still another feature of the invention is a telephone line circuit having cooperatively related timing and ring trip means individual thereto.

Yet another feature of the invention is novel timing and memory means for controlling the application of ringing to a line circuit.

These and other features of the invention will be fully appreciated upon consideration of the following description and the accompanying drawing, which drawing shows a line circuit in accordance with the invention and its relation to a schematically represented electronic telephone system.

The electronic telephone system representation is adapted from a full disclosure thereof in the aforementioned James patent; this patent is hereby incorporated by reference. Communication in a time-division system, such as that disclosed in the James patent, occurs over a common medium to which two or more communicating elements in the system are connected coordinatively at frequent intervals. Thus, in the drawing, common control 107 may interconnect ringing source 104 and line repeater 144 via transmission bus 109 by synchronously enabling transmission gates 105 and 103 at an illustrative rate of 8,000 times per second. Information in the system may be variously coded. Thus, ringing information may be passed by gate 105 in pulse coded (PCM) form, but appear at gate 103 in pulse amplitude (PAM) form. In the James patent, certain ringing information is generated according to a PCM code which when translated, develops the most negative available PAM signal at line gate 103; the present invention utilizes signals of the latter type to initiate substation ringing, and this is indicated symbolically by the negative potential sign in ringing source 104.

In the James patent, the central ringing source exercises complete control over the ringing cycle. For a six second ringing cycle comprising two seconds of ringing alternating with four seconds of silence, for example, the ringing source will supply tone signals for two of every six seconds while the called line is being rung. This control by the ringing source is represented symbolically in source 104 by make contact 145 which may be taken to be closed during the ringing interval and open during the silent interval. One of the advantages offered by the instant ringing arrangement is that ringing control need be exercised only briefly during each ringing cycle. Thus, for cooperation with the substation ringing arrangement disclosed herein, contact 145 need be closed to generate a ringing control pulse for only about one millisecond during each six second ringing cycle.

Line scanner 106 detects the service condition of the shown line circuit via conductor 143. Thus, when the substation goes off-hook (answer condition) after a period of ringing, a voltage will appear across talking ground supply resistor 142 and be transmitted via conductor 143 to line scanner 106. The scanning operation is fully described in the James patent, and is only represented symbolically here.

Information, including ringing signals, is conveyed between the shown line circuit and transmission bus via repeated 144, low pass filter 102, and line transmission gate 103. These elements are shown in the James patent.

A substation ringing arrangement of a type currently enjoying wide usage is shown at substation set 101. The capacitive ringer comprising capacitor 137 and bell 138 responds to 20-cycle ringing to alert the subscriber having substation set 101 to an incoming call. When switchhook 139 is in its normal, on-hook, condition, the ringer is connected directly across tip and ring conductors 133 and 134 via switchhook break contact 136. When switchhook 139 is in its off-normal, or off-hook, condition, the low impedance sub-talking path, represented symbolically by resistor 126, is connected across conductors 133 and 134 via make contact 135.

It may be noted that other subsets than the one shown might be served from conductors 133 and 134 according to a key telephone system arrangement such as that shown in H. T. Carter Patent 2,850,579 of September 2, 1958.

The local ringing source shown below ring conductor 134 may advantageously comprise source 108 of 20-cycle, 90-volt R.M.S. voltage impressed on 48-volts direct current from source 111. In this illustrative embodiment of the invention, all positive direct-current voltage sources such as source 111 may be considered to be at a voltage of plus 48 volts with respect to ground.

Ringing application relay 127 has contacts 127*a* through 127*f*, these contacts being shown in "detached contact" form. Relay 127 is operable to open the line circuit at break contacts 127*a* and 127*e*, to apply 20-cycle ringing to the substation via make contacts 127*b* and 127*f*, and to complete an RC timing circuit comprising resistor 131 and capacitor 129 via make contact 127*d*.

Resistor 132 is a relatively low valued resistor for completing to ground the ringing path through subset 101. Ring trip diode 130 permits timing capacitor 129 to charge rapidly from the ringing source when switchhook contact 135 is closed during ringing.

Trigger and memory diodes 128 and 123, respectively, are P-N-P-N breakdown diodes of the type disclosed in W. Shockley Patent 2,855,524 of October 7, 1958. Such diodes have a voltage-current characteristic which exhibits a high impedance, low current state separated from a low impedance, high current state by a negative resistance region. A P-N-P-N diode in its low current state is essentially nonconducting, and a relatively high, breakdown, voltage must be impressed across the diode to drive it into its conductive, high current state. In this disclosure, a P-N-P-N diode will be referred to as "nonconducting" when in its low current state, and as "conducting" when in its high current state. Diodes 128 and 123 may be assumed to have breakdown voltages of approximately 25 volts in this illustrated embodiment of the invention.

Trigger diode 128 is normally nonconducting, but is rendered conducting at the end of each ringing interval when the potential difference between timing capacitor 129 and reference terminal 124 reaches approximately 25 volts. Memory diode 123 is normally conducting between positive battery at source 146 and ground via switch transistor 120. While conducting, diode 123 shunts relay 127, preventing it from operating. At the beginning of each ringing interval, diode 123 is rendered nonconducting when switch transistor 120 is turned "off" in response to the receipe of a ringing control pulse from common control 107. Memory diode 123 then remains nonconducting until trigger diode 128 conducts at the end of the ringing interval, at which time the voltage at terminal 124 rises to 25 or more volts and diode 123 is rendered conductive.

Switch transistor 120 is normally in its "on" condition, supplying approximately ground potential to conductor 122 in the memory diode 123 conduction path. Transistor 120 is biased in its "on" condition by the voltage divider network comprising resistors 119 and 118, and the positive voltage source associated with resistor 119. When a negative ringing control pulse from common control 107 is passed through repeater 144 and integrated by the circuit composed of capacitor 116 and resistor 115, the resulting negative potential on conductor 117 causes transistor 120 to be biased to its "off" condition. The ringing control pulses need persist for only a short time, say one millisecond, during which memory diode 123 will be rendered nonconducting due to the "off" condition of transistor 120.

Having described the principal components of the ringing arrangement, the overall ringing operation will now be described.

When common control 107 determines that the subject line circuit is to be rung, it coordinates the operation of transmission gates 103 and 105 so that ringing information originating at source 104 may be transmitted to the line circuit. For a brief period of approximately one millisecond out of each six second ringing cycle, source 104 will generate a ringing control pulse which will appear as a pulse of negative amplitude at repeater 144. Each control pulse may be represented as a circuit from negative battery in ringing source 104, through make contact 145, ring transmission gate 105, over transmission bus 109, through line transmission gate 103, low pass filter 102, winding 114 of repeater 144, and thence to ground via the integrating network comprising resistor 115 and capacitor 116. Negative potential appearing on conductor 117 due to the control pulse biases switch transistor 120 to its "off" condition, in which condition it remains during the one millisecond that the control pulse is received.

When switch transistor 120 is turned "off," the potential across normally conducting memory diode 123 decreases to a point at which that diode is rendered non-conducting. Battery over stabilizing resistor 121 assists in this operation. When memory diode 123 becomes non-conducting, the potential at terminal 124 rises sufficiently to permit relay 127 to operate from plus 48 volts at source 146 via resistor 125 and its own winding to ground. The resistance of the relay 127 winding (not shown) may advantageously be about one-fourth that of resistor 125, thus giving rise to a potential of approximately 10 volts at terminal 124 when relay 127 is operated.

Relay 127 operated (1) opens at its break contacts 127*a* and 127*e* the tip and ring conductors of the line circuit; (2) closes at its make contact 127*d* the timing circuit comprising timing resistor 131 and timing capacitor 129; and (3) completes at its make contacts 127*b* and 127*f* the ringing circuit, which circuit may be traced from positive battery at source 111, and 90 volt, 20-cycle alternating-current potential at source 108, over current limiting protection resistor 140, make contact 127*f*, ring conductor 134, electromechanical ringer 138, capacitor 137, switchhook break contact 136, tip conductor 133, make contact 127*b*, and thence to ground via resistor 132. Resistor 132 is of relatively low value, so that the small voltage developed across it during ringing is insufficient to significantly affect the charging rate of timing capacitor 129.

While 20-cycle ringing is being applied in the previously-traced circuit, timing capacitor 129 charges from plus 48 volts via timing resistor 131. To provide a two second ringing interval, resistor 131 and capacitor 129 are advantageously of values such that their time constant is equal to approximately two seconds. At the end of the two second ringing interval, therefore, the potential across capacitor 129 will be about 35 volts, and the potential across trigger diode 128 will be its 25-volt breakdown voltage, terminal 124 being at a potential of approximately 10 volts as previously noted. Trigger diode 128 is thus rendered conductive at this time, and will momentarily raise the potential at terminal 124. In the meantime, the one millisecond period during which switch transistor 120 was in its "off" condition will have expired, and sufficient potential will therefore appear across memory diode 123 to return it to its normally conductive state. The discharge of timing capacitor 129 and the conduction in diode 123 will return diode 128 to its normal state of nonconduction. Conduction in memory diode 123 will lower the potential at terminal 124 to a point insufficient to maintain relay 127 operated. Relay 127 is thus "shunted down," and 20-cycle ringing is disconnected from the line circuit.

Ensuing upon the two second ringing interval will be a four second interval of silence. If the subscriber does not answer during the silent interval, ringing source 104 will transmit another ringing control signal to recommence the ringing cycle at the end of the four seconds. If the subscriber does answer during the four second silent interval, this will be detected by line scanner 106, and no more ringing control signals will be directed to the line circuit by common control 107.

Should the called subscriber answer during the ringing interval, the operation of switchhook 139 will open break contact 136, thus removing the high impedance substation ringer from the ringing circuit, and will close make contact 135, thereby including the low impedance substation talking path, indicated symbolically by resistor 126, in the ringing circuit. The substitution of the low impedance talking path for the high impedance ringer will increase the current through resistor 132, raise the voltage across it and cause timing capacitor 129 to charge rapidly from this voltage via ring trip diode 130. The consequent conduction in trigger diode 128 will terminate the ringing interval in the manner previously described.

It is to be understood that the above-described arrangement is merely illustrative of the application of the principles of the invention; numerous other arrangements may be devised by those skilled in the art without departing from the spirit and scope of the invention.

What is claimed is:

1. In combination, a substation line, a source of signalling energy connectable to and disconnectable from said line, common means for transmitting signalling control signals to said line, signalling control means at said line arranged to connect said source to said line in response to said control signals, and a timing circuit in said control means effective to measure a signalling interval beginning with the said connection of said source to said line, said control means including means effective under the control of said timing circuit to disconnect said source from said line at the end of said interval.

2. In combination, a substation line, a source of signalling energy connectable to and disconnectable from said line, common means for transmitting cyclically occurring control signals to said line, signalling control means at said line arranged to connect said source to said line in response to each of said control signals, and a timing circuit in said control means effective to measure a signalling interval beginning upon the said connection of said source to said line, said interval being of a duration intermediate that of one of said control signals and that of one of said cycles, said control means including means effective under the control of said timing circuit to disconnect said source from said line at the end of said interval.

3. The combination claimed in claim 1 in which said signalling control means includes memory means effective upon the receipt of one of said control signals at said line to render the subsequent connection of said source to said line independent of further control signals from said common means.

4. In combination, a substation set having first and second impedance paths, a substation line normally terminating in said first impedance path and transferable to said second impedance path, a source of signalling energy connectable to and disconnectable from said line, common means for transmitting signalling control signals to said line, signalling control means at said line arranged to connect said source to said line in response to said control signals, a timing circuit in said control means effective to measure a signalling interval beginning upon the said connection of said source to said line, said control means including ring trip means effective upon the transference of said line to said second impedance path during said interval to disconnect said source from said line before the end of said interval.

5. In combination, a substation set having first and second impedance paths, a substation line normally terminating in said first impedance path and transferable to said second impedance path, a source of signalling energy connectable to and disconnectable from said line, common means for transmitting signalling control signals to said line, signalling control means at said line arranged to connect said source to said line in response to said control signals, a timing circuit in said control means effective to measure a signalling interval beginning upon the said connection of said source to said line, said control means including ring trip means operative jointly with said timing circuit upon the transference of said line to said second impedance path during said interval to disconnect said source from said line before the end of said interval.

6. In a telephone system, a substation line, a source of ringing energy connectable to and disconnectable from said line, common means for transmitting information including ringing control pulses to said line, and a ringing control circuit at said line, said control circuit comprising application means responsive to one of said control pulses to connect said source to said line, timing circuit means energized upon the response of said application means to measure a ringing interval, and trigger means operable by said timing means at the end of said interval to cause said application means to disconnect said source from said line.

7. In a telephone system, a substation line, a source of ringing energy connectable to and disconnectable from said line, common means for transmitting information including cyclically occurring control pulses to said line, and a ringing control circuit individual to said line, said control circuit comprising application means responsive to one of said control pulses to connect said source to said line, timing circuit means energized upon the response of said application means to measure a ringing interval of a duration substantially greater than that of one of said control pulses and substantially shorter than that of one of said cycles, and trigger means operable by said timing means at the end of said interval to cause said application means to disconnect said source from said line.

8. In a telephone system, a substation line, a source of ringing energy connectable to and disconnectable from said line, common means for transmitting information including ringing control pulses to said line, and a ringing control circuit at said line, said control circuit comprising application means responsive to one of said control pulses to connect said source to said line, timing circuit means energized upon the response to said application means to measure a ringing interval, memory means in said application means effective to render the connection of said source to said line independent of control by said common means during said interval, and trigger means operable by said timing means at the end of said interval to cause said application means to disconnect said source from said line.

9. In a telephone system, a substation set having a high impedance ringing path and a low impedance talking path, a substation line normally including said ringing path, switchhook means in said set operable to transfer said line from said ringing path to include said talking path, a source of ringing energy connectable to and disconnectable from said line, common means for transmitting information including ringing control pulses to said line, and a ringing control circuit at said line, said control circuit comprising application means responsive to one of said control pulses to connect said source to said line, timing circuit means energized upon the response of said application means to measure a ringing interval, and ring trip means effective upon the operation of said switchhook means during said interval to disconnect said source from said line before the end of said interval.

10. In a telephone system, a substation set having a high impedance ringing path and a low impedance talking path, a substation line normally including said ringing path, switchhook means in said set operable to transfer said line from said ringing path to include said talking path, a source of ringing energy connectable to and disconnectable from said line, common means for transmitting information including ringing control pulses to said line, and a ringing control circuit at said line, said control circuit comprising application means responsive to one of said control pulses to connect said source to said line, timing circuit means energized upon the response of said application means to measure a ringing interval, and ring trip means jointly operative with said timing circuit means upon the operation of said switchhook means during said interval to disconnect said source from said line before the end of said interval.

11. In an electronic telephone system, a substation line, a source of high power ringing energy connectable to and disconnectable from said line, switching means for transmitting cyclically occurring low power ringing control pulses to said line, and a ringing control circuit individual to said line, said control circuit comprising normally conductive memory means rendered nonconductive upon the receipt of each of said pulses, relay means operated when said memory means is nonconductive to connect said source to said line and released when said memory means is conductive to disconnect said source from said line, timing means energized by the operation of said relay means to measure a ringing interval, and normally nonconductive trigger means rendered conductive by said timing means at the end of said interval to render conductive said memory means.

12. In an electronic telephone system, a substation line, a source of high power ringing energy connectable to and disconnectable from said line, time-division switching means for transmitting cyclically occurring ringing control pulses to said line, and a ringing control circuit individual to said line, said control circuit comprising normally conductive memory means rendered nonconductive upon the receipt of each of said pulses, relay means operated when said memory means is nonconductive to connect said source to said line and released when said memory means is conductive to disconnect said source from said line, timing means energized by the operation of said relay means to measure a ringing interval of a duration substantially greater than that of one of said control pulses and substantially shorter than that of one of said cycles, and normally nonconductive trigger means rendered conductive by said timing means at the end of said interval to render conductive said memory means.

13. In an electronic telephone system, a substation set having a ringing path including a high impedance ringer in series with a capacitor and having a talking path of substantially lower impedance than said ringing path, a substation line normally including said ringing path, switchhook contacts in said set operable to transfer said line from said ringing path to include said talking path, a source of high power ringing energy connectable to and disconnectable from said line, time-division switching means for transmitting cyclically occurring ringing control pulses to said line, and a ringing control circuit individual to said line, said control circuit comprising normally conductive memory means rendered nonconductive upon the receipt of each of said pulses, relay means operated when said memory means is nonconductive to connect said source to said line and released when said memory means is conductive to disconnect said source from said line, timing means energized by the operation of said relay means to measure a ringing interval of a duration substantially greater than that of one of said control pulses and substantially shorter than that of one of said cycles, normally nonconductive trigger means rendered conductive by said timing means at the end of said interval to render conductive said memory means, and ring trip means effective upon the operation of said switchhook contacts during said interval to render conductive said trigger means before the end of said interval.

14. The electronic telephone system claimed in claim 13 wherein said timing means comprises a timing capacitor which charges to a breakdown voltage during the ringing interval, wherein said breakdown voltage on said capacitor causes said trigger means to conduct, and wherein said ring trip means includes said capacitor and is effective when said switchhook contacts are operated during said interval to prematurely charge said capacitor to said breakdown voltage.

15. The electronic telephone system claimed in claim 14 wherein said memory means and said trigger means each comprises a P-N-P-N diode.

References Cited in the file of this patent

UNITED STATES PATENTS

| | | |
|---|---|---|
| 2,152,475 | Halligan | Mar. 28, 1939 |
| 2,910,540 | Van Mierlo et al. | Oct. 27, 1959 |